United States Patent
Stribaek et al.

(10) Patent No.: US 7,318,145 B1
(45) Date of Patent: Jan. 8, 2008

(54) RANDOM SLIP GENERATOR

(75) Inventors: Morten Stribaek, Frederiksberg (DK); Jakob Schou Jensen, Copenhagen (DK); Jean-Francois Dhem, Aix-en-Provence (FR)

(73) Assignee: MIPS Technologies, Inc., Mountain View, CA (US)

( * ) Notice: Subject to any disclaimer, the term of this patent is extended or adjusted under 35 U.S.C. 154(b) by 414 days.

(21) Appl. No.: 10/141,579

(22) Filed: May 9, 2002

Related U.S. Application Data

(60) Provisional application No. 60/294,598, filed on Jun. 1, 2001.

(51) Int. Cl.
*G06F 9/30* (2006.01)
*G06F 9/40* (2006.01)
*G06F 15/00* (2006.01)

(52) U.S. Cl. ............... 712/220; 712/23; 712/219; 712/233; 713/190

(58) Field of Classification Search ........... 712/220, 712/233, 219, 23, 1; 713/19, 200, 190; 380/268, 380/258
See application file for complete search history.

(56) References Cited

U.S. PATENT DOCUMENTS

| | | | |
|---|---|---|---|
| 4,023,023 A | 5/1977 | Bourrez et al. | |
| 4,085,447 A | 4/1978 | Pertl et al. | |
| 4,569,016 A | 2/1986 | Hao et al. | |
| 4,908,038 A | 3/1990 | Matsumura et al. | |
| 4,928,223 A | 5/1990 | Dao et al. | |
| 4,949,250 A | 8/1990 | Bhandarkar et al. | |
| 5,181,183 A | 1/1993 | Miyazaki | |
| 5,404,402 A | 4/1995 | Sprunk | |
| 5,471,628 A | 11/1995 | Phillips et al. | |
| 5,499,299 A | 3/1996 | Takenaka et al. | |
| 5,664,017 A | 9/1997 | Gressel et al. | |
| 5,673,407 A | 9/1997 | Poland et al. | |
| 5,696,937 A * | 12/1997 | White et al. | 711/142 |
| 5,729,554 A * | 3/1998 | Weir et al. | 714/739 |
| 5,748,979 A | 5/1998 | Trimberger | |
| 5,761,523 A | 6/1998 | Wilkinson et al. | |
| 5,768,172 A | 6/1998 | Derby | |
| 5,778,074 A | 7/1998 | Garcken et al. | |
| 5,781,457 A | 7/1998 | Cohen et al. | |
| 5,812,669 A | 9/1998 | Jenkins et al. | |
| 5,819,117 A | 10/1998 | Hansen | |
| 5,838,795 A | 11/1998 | Mittenthal | |
| 5,838,986 A | 11/1998 | Garg et al. | |

(Continued)

OTHER PUBLICATIONS

Christophe Clavier et al.; "Differential Power Analysis in the Presence of Hardware Countermeasures"; CHES 2000, LNCS 1965, pp. 252-263 (2000).

(Continued)

*Primary Examiner*—Donald Sparks
*Assistant Examiner*—Jesse Moll
(74) *Attorney, Agent, or Firm*—Sterne, Kessler, Goldstein & Fox PLLC

(57) ABSTRACT

A random slip generator is provided to lessen side channel leakage and thus thwart cryptanalysis attacks, such as timing attacks and power analysis attacks. Random slip generation may be configurable so that the average frequency of random slips generated by the system may be set. Additional techniques are provided to make nullified instructions consume power like any other executing instruction.

35 Claims, 9 Drawing Sheets

U.S. PATENT DOCUMENTS

| | | | |
|---|---|---|---|
| 5,850,452 | A | 12/1998 | Sourgen et al. |
| 6,009,450 | A | 12/1999 | Dworkin et al. |
| 6,035,317 | A | 3/2000 | Guy |
| 6,041,122 | A | 3/2000 | Graunke et al. |
| 6,041,403 | A | 3/2000 | Parker et al. |
| 6,049,613 | A | 4/2000 | Jakobsson |
| 6,064,740 | A | 5/2000 | Curiger et al. |
| 6,067,615 | A | 5/2000 | Upton |
| 6,069,954 | A | 5/2000 | Moreau |
| 6,138,229 | A | 10/2000 | Kucukcakar et al. |
| 6,141,421 | A | 10/2000 | Takaragi et al. |
| 6,141,786 | A | 10/2000 | Cox et al. |
| 6,145,077 | A | 11/2000 | Sidwell et al. |
| 6,154,834 | A | 11/2000 | Neal et al. |
| 6,172,494 | B1 | 1/2001 | Feuser |
| 6,199,087 | B1 | 3/2001 | Blake et al. |
| 6,199,088 | B1 | 3/2001 | Weng et al. |
| 6,256,743 | B1 | 7/2001 | Lin |
| 6,278,783 | B1 | 8/2001 | Kocher et al. |
| 6,279,023 | B1 | 8/2001 | Weng et al. |
| 6,295,599 | B1 | 9/2001 | Hansen et al. |
| 6,298,438 | B1 | 10/2001 | Thayer et al. |
| 6,304,658 | B1 | 10/2001 | Kocher et al. |
| 6,327,661 | B1 | 12/2001 | Kocher et al. |
| 6,381,690 | B1 | 4/2002 | Lee |
| 6,430,684 | B1 | 8/2002 | Bosshart |
| 6,510,518 | B1 | 1/2003 | Jaffe et al. |
| 6,615,366 | B1 * | 9/2003 | Grochowski et al. ......... 714/10 |
| 6,618,804 | B1 | 9/2003 | Steele, Jr. et al. |
| 6,625,737 | B1 | 9/2003 | Kissell |
| 6,654,884 | B2 | 11/2003 | Jaffe et al. |
| 6,715,066 | B1 | 3/2004 | Steele, Jr. |
| 6,952,478 | B2 | 10/2005 | Lee et al. |
| 2003/0172254 | A1 | 9/2003 | Mandavilli et al. |

OTHER PUBLICATIONS

U.S. Appl. No. 09/894,812, inventor Kevin D. Kissell filed Jun. 28, 2001.

Shi, Z., and Lee, R.B., "Bit Permutation Instructions for Accelerating Software Cryptography," *Proceedings of the IEEE International Conference on Application-specific Systems, Architectures and Processors*, pp. 138-148, Boston, MA (Jul. 10-12, 2000).

Marketing literature from Philips Semiconductors, "On the Move - Philips Semiconductors and IBM Research to Co-develop Secure Smart Cards" [online]. Feb. 1999, Document order No. 9397.750. 05157, [Retrieved on Feb. 1, 2006]. Retrieved from the Internet: <URL: http://www.semiconductors.philips.com/acrobat_download/literature/9397/75005157.pdf>.

Philips Semiconductors Short Form Specification, "P16WX064 SmartXA-Family, Secure 16-bit Smart Card Controller," Revision 1.1 [online]. Feb. 2001, pp. 1-11 [Retrieved on Feb. 1, 2006]. Retrieved from the Internet: <URL: http://www.semiconductors.philips.com/acrobat_download/other/identification/sfs052411.pdf>.

Certification Report BSI-DSZ-CC-0203-2003 for Philips Smart Card Controller P16WX064V0C [online]. Philips Semiconductors GmbH [Retrieved on Feb. 1, 2006]. Retrieved from the Internet: <URL: http://www.bsi.bund.de//zertifiz/zert/reporte/0203a.pdf>.

"Security Target BSI-DSZ-CC-0203, Version 1.1, Jan. 24th, 2003, Evaluation of the Philips P16WX064V0C Secure 16-bit Smart Card Controller" [online]. Philips Semiconductors GmbH, pp. 1-74 [Retrieved on Feb. 1, 2006]. Retrieved from the Internet: <URL: http://www.commoncriteriaportal.org/public/files/epfiles/0203b.pdf>.

Jean-Francois Dhem and Nathalie Feyt, "Hardware and Software Symbiosis Helps Smart Card Evolution" [online]. IEEE Micro, Nov.-Dec. 2001, pp. 14-25 [Retrieved on Feb. 1, 2006]. Retrieved from the Internet: <URL: http://www.it.iitb.ac.in/~satish/Thesis%20Report%20New%201/2_Review%20of%20literature/2_reference/2_29_Hardware%20and%20software%20symbiosis%20helps%20smart%20card%20evolution.pdf>.

Jean-Francois Dhem and Nathalie Feyt, "Present and Future Smart Cards" [online]. Gemplus - Card Security Group, pp. 1-9 [Retrieved on Feb. 1, 2006]. Retrieved from the Internet: <URL: http://www.it-c.dk/courses/DSK/F2003/smart2.pdf>.

Kutler, Jeffrey, *Smart Cards; Even Abundant Security Features Don't Spur Smart Card Buy-in*, AMERICAN BANKER, vol. 163, No. 221, Nov. 18, 1998, *available in* Am. Banker 11998 WL 13326041.

*STMicroelectronics And Gemplus Announce Smart Card Security Certification Including Hardware And Software*, EDP WEEKLY 's IT MONITOR, vol. 42, Issue 12, Apr. 2, 2001, *available in* EDP Wkly. 42001 WL 14018034.

*Can Silicon Stop The Smartcard Hackers?*, ELECTRONICS TIMES, Feb. 15, 1999, *available in* Electronics Times 321999 WL 9348105.

*STMicroelectronics And Gemplus Announce Smart Card Security Certification Including Hardward And Software*, BUSINESS WIRE, Mar. 29, 2001, *available in* WESTLAW, Mar. 29, 2001 Bus. Wire 02:05:00.

Vollmer, ALfred, *Security ICs Are Targeting Consuming Applications*, ELECTRONIC DESIGN, vol. 48, Issue 23, Nov. 6, 2000, *available in* Electronic Design 1052000 WL 14003957.

Coron, J.-S. and Goubin, L-, "On Boolean and Arithmetic Masking Against Differential Power Analysis," in *Proceedings of Second International Workshop on Cryptographic Hardware and Embedded Systems, CHES 2000* (Eds., C.K. Koc and C. Paar), Worcester, Massachusetts, USA, Aug. 17-18, 2000, pp. 231-237, Springer-Verlag, Berlin/Heidelberg, Germany (2000).

Hasan, M. Anwar, "Power Analysis Attacks and Algorithmic Appoaches to their Countermeasures for Koblitz Curve Cryptosystems," in *Proceedings of Second International Workshop on Cryptographic Hardware and Embedded Systems, CHES 2000* (Eds., C.K. Koc and C. Paar), Worcester, Massachusetts, USA, Aug. 17-18, 2000, pp. 93-108, Springer-Verlag, Berlin/Heidelberg, Germany (2000).

Kato, T. et al., "A Design for Modular Exponentiation Coprocessor in Mobile Telecommunication Terminals," in *Proceedings of Second International Workshop on Cryptographic Hardware and Embedded Systems, CHES 2000* (Eds., C.K. Koc and C. Paar), Worcester, Massachusetts, USA, Aug. 17-18, 2000, pp. 216-228, Springer-Verlag, Berlin/Heidelberg, Germany (2000).

Myer-Sommer, R., "Smartly Analyzing the Simplicity and the Power of Simple Power Analysis on Smartcards," in *Proceedings of Second International Workshop on Cryptographic Hardware and Embedded Systems, CHES 2000* (Eds., C.K. Koc and C. Paar), Worcester, Massachusetts, USA, Aug. 17-18, 2000, pp. 78-92, Springer-Verlag, Berlin/Heidelberg, Germany (2000).

Naccache, D. and Tunstall, M., "How to Explain Side-Channel Leakage to your Kids," in *Proceedings of Second International workshop on Cryptographic Hardware and Embedded Systems, CHES 2000* (Eds., C.K. Koc and C. Paar), Worcester, Massachusetts, USA, Aug. 17-18, 2000, pp. 229-230, Springer-Verlag, Berlin/Heidelberg, Germany (2000).

Shamir, A., "Protecting Smart Cards from Passive Power Analysis with Detached Power Supplies," in *Proceedings of Second International Workshop on Cryptographic Hardware and Embedded Systems, CHES 2000* (Eds., C.K. Koc and C. Paar), Worcester, Massachusetts, USA, Aug. 17-18, 2000, pp. 71-77, Springer-Verlag, Berlin/Heidelberg, Germany (2000).

Weingart, S.H., "Physical Security Devices for Computer Subsystems: A Survey if Attacks and Defenses," in *Proceedings of Second International Workshop on Cryptographic Hardware and Embedded Systems, CHES 2000* (Eds., C.K. Koc and C.Paar), Worcester, Massachusetts, USA, Aug. 17-18, 2000, pp. 302-317, Springer-Verlag, Berlin/Heidelberg, Germany (2000).

Kocher, P. et al., "Differential Power Analysis," in *Advances in Cryptology - Proceedings of 19th Annual International Cryptology Conference, CRYPTO '99* (Ed. Michael J. Wiener), Santa Barbara, California, USA, Aug. 15-19, 1999, Springer-Verlag, Berlin/Heidelberg, Germany (1999) 10 pages.

Daemen, J. et al., "Bitslice Ciphers and Power Analysis Attacks," presented at *Fast Software Encryption Workshop 2000*, New York, New York, USA, Apr. 10-12, 2000 (16 pages).

Jae Wook Chung et al., "Fast Implementation of Elliptic Curve Defined over GF9p$^m$) on CalmRISC with MAC2424 Coprocessor," C.K. Koc and C. Paar (Eds.): CHES 2000, LNCS 1965, pp. 57-70, 2000 (11 pages).

Darrel Hankerson et al., "Software Implementation of Elliptic Curve Cryptography over Binary Fields," C.K. Koc. and C. Paar (Eds.): CHES 2000, LNCS 1965, pp.1-24, 2000 (24 pages).

Marc Joye et al., "Efficient Generation of Prime Numbers," C.K. Koc and C. Paar (Eds.): CHES 2000, LNCS 1965, pp. 340-354, 2000 (15 pages).

Souichi Okada et al., "Implementation of Elliptic Curve Cryptographic Coprocessor over GF($2^m$) on an FPGA," C.K. Koc and C. Paar (Eds.): CHES 2000, LNCS 1965, pp. 25-40, 2000 (16 pages).

Geraldo Orlando et al., "A High-Performance Reconfigurable Elliptic Curve Processor for GF($2^m$), " C.K. Koc and C. Paar (Eds.): CHES 2000, LNCS 1965, pp. 41-56, 2000 (16 pages).

Erkay Savas et al., "A Scalable and Unified Multiplier Architecture for Finite Fields GF(p) and GF($2^m$), " C.K. Koc and C. Paar (Eds.), CHES 2000, LNCS 1965, pp. 277-282 and 284-292, 2000 (15 pages).

Shi, Z., and Lee, R.B., "Bit Permutation Instructions for Accelerating Software Cryptography," *Proceedings of the IEEE International Conference on Application-specific Systems, Architectures and Processors*, pp. 138-148, Boston, MA, USA, Jul. 10-12, 2000 (11 pages).

Koc, C.K., and Acar, T., "Montgomery Multiplication in GF (2k)," *Proceedings of the Third Annual Workshop on Selected Areas in Cryptography*, pp. 95-106, Queens University, Kingston, Ontario, Canada, Aug. 15-16, 1996 (13 pages).

IBM Technical Disclosure Bulletin, "Pipelined Hardware Multiplier with Extended Precision," vol. 23, Issue 9, pp. 4322-4323, Feb. 1, 1981 (5 pages).

*A236 Parallel Digital Signal Processor Chip Programmer's Reference Manual*, Oxford Micro Devices, Inc., 1994, 195 pages (Bates Numbers L11184-L11378).

*DSP56000 24-Bit Digital Signal Processor Family Manual*, Motorola, Inc., 1995, 638 pages (Bates Numbers L08722-L09359).

Lijun Gao, Sarvesh Shrivastava, Hanbo Lee, Gerald E. Sobelman, "A Compact Fast Variable Key Size Elliptic Curve Cryptosystem Coprocessor," *Proceedings of the 7th Annual IEEE Symposium on Field-Programmable Custom Computing Machines*, Apr. 21-23, 1999, pp. 304-305 (4 pages).

*i860™ Microprocessor Family Programmer's Reference Manual*, Intel Corporation, 1992, 79 pages (Bates Numbers L09361-L09439).

*IEEE Standard for Binary Floating-Point Arithmetic*, IEEE, 1985, pp. i-vi and 1-14.

Koc, C.K., and Acar, T., "Fast Software Exponentiation in GF($2^k$)," *Proceedings of the 13th IEEE Symposium on Computer Arithmetic*, IEEE, Jul. 6-9, 1997, pp. 225-231 (9 pages).

*TMS320C1x/C2x/C2xx/C5x Assembly Language Tools User's Guide*, Texas Instruments, Mar. 1995, 483 pages (Bates Numbers L07916-L08398).

*TMS320C5x General-Purpose Applications User's Guide*, Texas Instruments, Jul. 1997, 167 pages (Bates Numbers L08399-L08565).

*VIS™ Instruction Set User's Manual*, Sun Microsystems, Inc., 1997, pp. i-xii and 1-136.

Patent Abstracts of Japan, Publication No. JP11203106 (Jul. 30, 1999), English Language Abstract for JP Patent Application No. JP19980005096 (Jan. 13, 1998).

Patent Abstracts of Japan, Publication No. JP4142618 (May 15, 1992), English Language Abstract for JP Patent Application No. JP19900264991 ( Oct. 4, 1990).

Patent Abstracts of Japan, Publication No. JP61223938 (Oct. 4, 1986), English Language Abstract for JP Patent Application No. JP19850063782 ( Mar. 29, 1985).

Patent Abstracts of Japan, Publication No. JP8314717 ( Nov. 29, 1996), English Language Abstract for JP Patent Application No. JP19960146619 ( May 16, 1996).

Patent Abstracts of Japan, Publication No. JP2003533829T ( Nov. 11, 2003), English Language Abstract for JP Patent Application No. JP20010585439T (May 7, 2001).

Redacted R21 Informal Technical Report, R21-TECH-30-95, titled "CAPSTONE (MYK-80) Specifications (U)", Reportedly obtained from the National Security Agency by FOIA request (Aug. 14, 1995) 27 pages.

MYK-78 Clipper Chip Encryption/Decryption on a Chip; (1993) 3 pages.

Ross Anderson et al. "Tamper Resistance - a Cautionary Note", USENIX Association in *The Second USENIX Workshop on Electronic Commerce Proceedings*, Oakland, CA, Nov. 18-21, 1996, 11 pages.

Earnest F. Brickell, et al. "Skipjack Review, Interim Report, The SkipJack Algorithm"; Amperif Corporation, Jul. 28, 1993, 60 pages.

Paul Kocher, et al. "Differential Power Analysis", Cryptography Research Inc., (1999) 10 pages.

* cited by examiner

RANDOM SLIP GENERATOR

This application claims priority from U.S. Provisional Application No. 60/294,598, titled "Random Slip Generator", and filed Jun. 1, 2001, the contents of which are hereby incorporated by reference.

TECHNICAL FIELD

This invention relates to a technique for increasing processor security, and more particularly to a technique for introducing slips into a pipeline to make the timing profile of code running on the processor less deterministic.

BACKGROUND

Traditional cryptanalysis has focused predominantly on exploiting underlying algorithms and/or protocols used to encrypt data. Even though an encryption scheme may be theoretically secure, it still may be possible to decrypt data using information obtained regarding the execution of a cryptographic algorithm. Information obtained from the operation of a cryptographic device, such as a computer or smart card, that may be used to identify and/or deduce secret information is called side-channel leakage.

Many different techniques have been developed to obtain and exploit side-channel leakage including timing attacks, power attacks, and fault generation. In a timing attack, side-channel information regarding the time that it takes for an algorithm to execute on a device can be used to deduce secret information. By taking advantage of side-channel information regarding the length of time used to encrypt or decrypt data, an attacker may be able to use knowledge about the underlying algorithm to deduce secret information.

In a power attack, information regarding the power consumption of a device performing cryptographic operations may be used to determine secret information. By performing a statistical analysis of the electronic power consumption of a device performing a large number of cryptographic operations with the same key, an attacker may be able to deduce secret information.

In a fault generation attack, the normal operation of a device may be compared to the operation of the same device under fault conditions to deduce secret information. For example, physical faults may include temperature, radiation, physical stress, and voltage variations.

By exploiting side-channel leakage, an attacker may be able to compromise the security of cryptographic devices even though the underlying algorithms and protocols used by those devices are theoretically secure.

SUMMARY

In one general aspect, a microprocessor with random slip generation is provided. The microprocessor includes a pipelined instruction execution unit having a pipeline, pipeline control logic coupled to the pipelined instruction execution unit that may be used to control the pipeline, and a random number generator that generates a random value. The pipeline control logic selectively initiates a pipeline slip based on the random value.

In some implementations, initiating a pipeline slip includes inserting a no-operation (NOP) instruction into the pipeline in place of an active instruction, and reissuing the active instruction in a following clock cycle. Alternatively, some implementations may selectively initiate a pipeline slip by nullifying an instruction executing within the pipeline and reissuing the instruction in a following clock cycle with both the nullified instruction and the reissued instruction passing through the pipeline.

Random slip generation may include one or more features designed to make nullified instructions indistinguishable from other instructions. For example, when reissuing the instruction in a following clock cycle, the microprocessor may refetch the instruction. Additionally, the pipelined instruction execution unit may include an arithmetic logic unit (ALU), and operands of the nullified instruction may be changed so that data passed through the ALU by the nullified instruction differs from data passed through the ALU by the reissued instruction. Some implementations may include changing the nullified instruction so that registers to which the nullified instruction refers differ from registers to which the reissued instruction refers.

The microprocessor may include a multiplication unit that is selectively active when a nullified instruction is passing through the pipeline. The multiplication unit may be activated based on some random value.

Some implementations include a random slip generation control register that may be used to specify the average frequency of slips per clock cycle. For example, the random slip generation control register may include three bits that may be used to specify an average frequency of slips per clock cycle from the group consisting of: 0, ½, ¼, ⅛, 1/16, 1/32, 1/64, and 1/128. The slip generation control register may specify the average frequency of slips by setting the number of bits of the random value used to selectively initiate a pipeline slip. The system may selectively initiate a pipeline slip based on the random value if each of the random value bits specified by the control register is zero.

Additionally, the microprocessor may include a random slip generation pin such that the control logic selectively initiates a pipeline slip if the random slip generation pin is asserted.

The details of one or more implementations are set forth in the accompanying drawings and the description below. Other features and advantages will be apparent from the description and drawings, and from the claims.

DETAILED DESCRIPTION

If the power consumption and timing profiles of a computer program are deterministic, then an attacker may be able to extract secret information by analyzing the time that it takes for the program to execute, the power consumption during execution, and/or electromagnetic radiation emitted during execution.

By introducing slips in the execution pipeline of a processor at random times, the timing profile and power consumption of a program running on a processor may be made less deterministic. To help prevent slips from being detected by an attacker measuring power consumption, the processor may be implemented such that the power consumed in a normal running cycle is comparable to the power consumed during a random slip.

Figure 1:
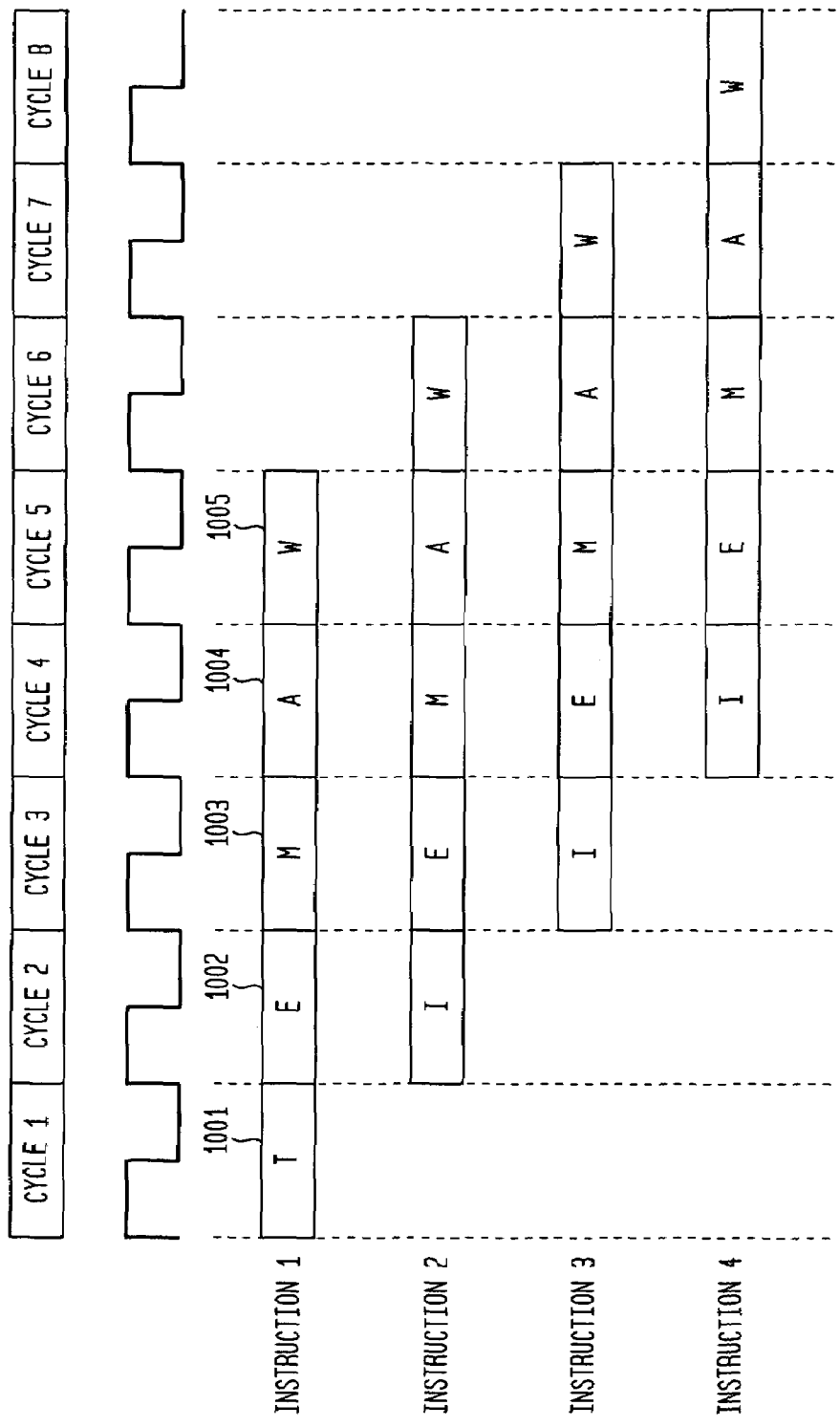
FIG. 1 is a timing diagram of an exemplary five-stage pipeline that may be used in a RISC architecture.

Referring to FIG. 1, an exemplary microprocessor architecture that may implement random slip generation includes a five-stage pipeline within an execution unit in which each instruction is executed in a fixed amount of time, such as, for example, five clock cycles. The execution of each instruction is divided into five stages: instruction fetch (I) stage 1001, execution (E) stage 1002, memory fetch (M) stage 1003, align/accumulate (A) stage 1004, and writeback (W) stage 1005. In the I stage 1001, a specified instruction is fetched from an instruction cache. A portion of the fetched instruction may be used to specify source registers that may be used in executing the instruction. In the E stage 1002, the system fetches the contents of the specified source registers. These fetched values may be used to perform arithmetic or logical operations. The processor also uses the E stage to begin performing multiply/divide operations and arithmetic logic unit (ALU) operations.

In the M stage 1003, ALU operations complete and an executing instruction may cause memory to be read from a data cache. In the A stage 1004, loaded data are aligned with word boundaries and multiplier accumulations and carry propagations are performed. Finally, in the W stage 1005, values obtained by the execution of the instruction may be written back to a register.

It should be understood that the five-stage pipeline architecture discussed above is given for purposes of example only. Those of skill in the art will appreciate that random slip generation may be implemented in any pipeline architecture.

In a typical processor, smooth pipeline flow occasionally may be interrupted by some event, such as a cache miss or a data dependency hazard. Interruptions handled using hardware, such as cache misses, are often referred to as interlocks. At each cycle, interlock conditions are checked for all active instructions. If an interlock is detected, processors typically resolve the interlock using stalls, which are resolved by halting the pipeline, or slips, which allow one part of the pipeline to advance while another part of the pipeline is held static. Slipped instructions are retried on subsequent cycles until they issue. The back end of the pipeline advances normally during slips in an attempt to resolve the conflict. No-operations (NOPs) may be inserted into the bubble in the pipeline.

Figure 2:
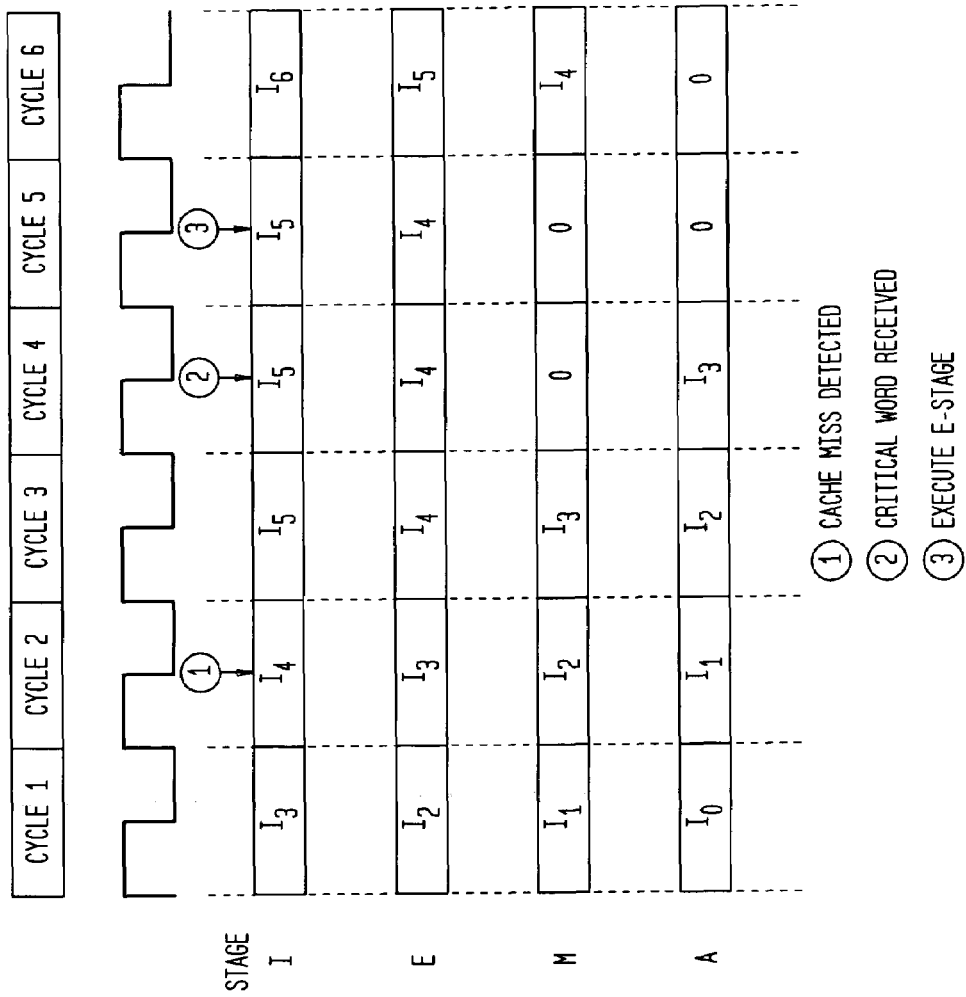
FIG. 2 is a timing diagram describing a pipeline slip in response to an instruction cache miss.

Referring to FIG. 2, a slip may occur if an instruction fetch results in a cache miss. If the instruction is unavailable, then the processor may insert NOPs into the pipeline until the instruction issues. For example, in clock cycle 1, instruction $I_3$ is in the I stage 1001 of the pipeline, instruction $I_2$ is in the E stage 1002, instruction $I_1$ is in the M stage 1003, and instruction $I_0$ is in the A stage 1004.

At each clock cycle, interlock conditions are evaluated to determine if a slip is needed. In cycle 2, each of instructions $I_1$–$I_3$ proceeds to the next stage of the pipeline, and the processor attempts to fetch instruction $I_4$ in the I stage 1001. In the example shown in FIG. 2, this instruction fetch results in a cache miss. Because instruction $I_4$ is not available, one or more slips are inserted in the pipeline, as shown below.

In cycle 3, instruction $I_4$ advances to the E stage 1002 and waits for the instruction to be fetched from main memory, and instructions $I_2$ and $I_3$ proceed to the next stage of the pipeline.

In cycle 4, the cache miss is resolved, the instruction is bypassed to the cache, and the pipeline is restarted. The interlock may also be handled without the bypass by immediately stalling the pipeline upon detection of a cache miss. In cycle 4, instruction $I_3$ proceeds to the A stage 1004, and there is no instruction in the M stage 1003.

In cycle 5, instruction $I_5$ is fetched in the I stage 1001, instruction $I_4$ is executed in the E stage 1002, and there are no instructions in the M stage 1003 or the A stage 1004.

Figure 3:
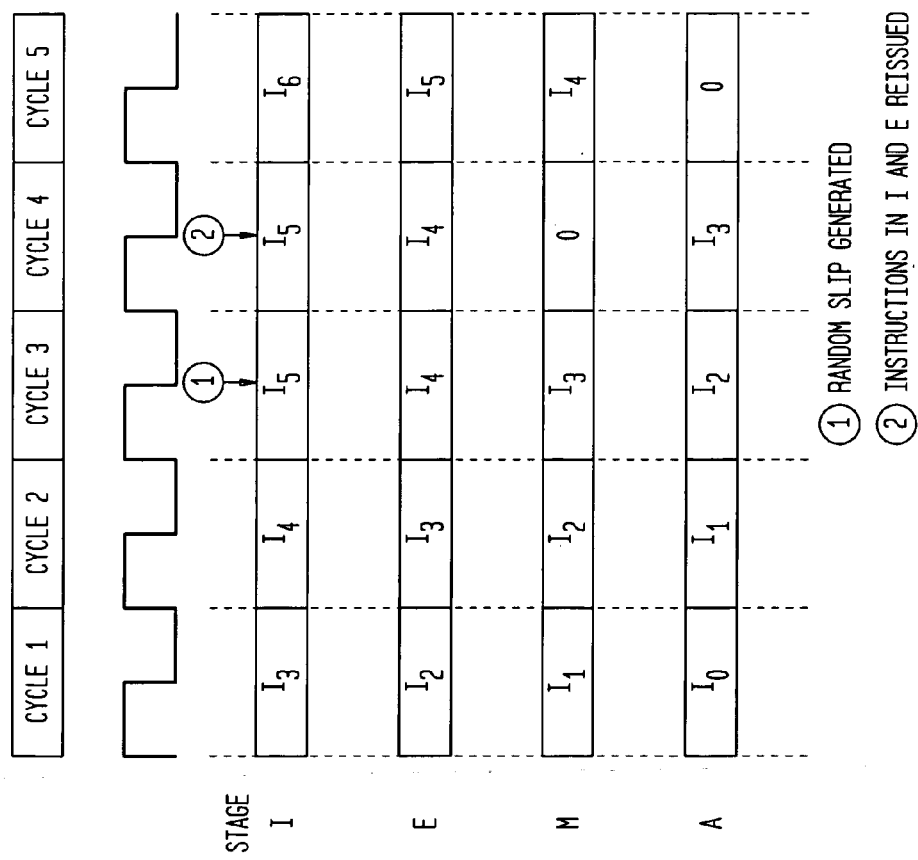
FIG. 3 is a timing diagram describing a randomly-generated pipeline slip inserting a no operation (NOP) instruction into the pipeline.

Referring to FIG. 3, the power and timing profile of a processor may be made less deterministic by adding logic to randomly generate slips in the pipeline. One way to implement random slip generation is to add an interlock condition to the existing interlock logic. For example, logic could be added to the E stage 1002 interlock logic to randomly raise a one-cycle interlock condition. By introducing a pipeline slip such as is described with reference to FIG. 2, the processor can thwart attempts to exploit the timing profile of an executing program. In FIG. 3, the modified interlock logic randomly determines to generate a pipeline slip in cycle 3. When a slip occurs, the instructions in the I stage 1001 and the E stage 1002 are reissued during the following clock cycle and a NOP instruction passes to the M stage 1003 in cycle 4. The pipeline then continues normally. By introducing random slips into the instruction stream, the timing profile of algorithms executing on the processor becomes indeterministic. However, a NOP instruction may have a different power consumption profile than other instructions. While a processor randomly issuing NOPs may provide protection against some timing attacks, it may not provide protection against power analysis attacks. Therefore, it may be advantageous to instead issue an instruction with a power profile indistinguishable from other instructions.

Figure 4:
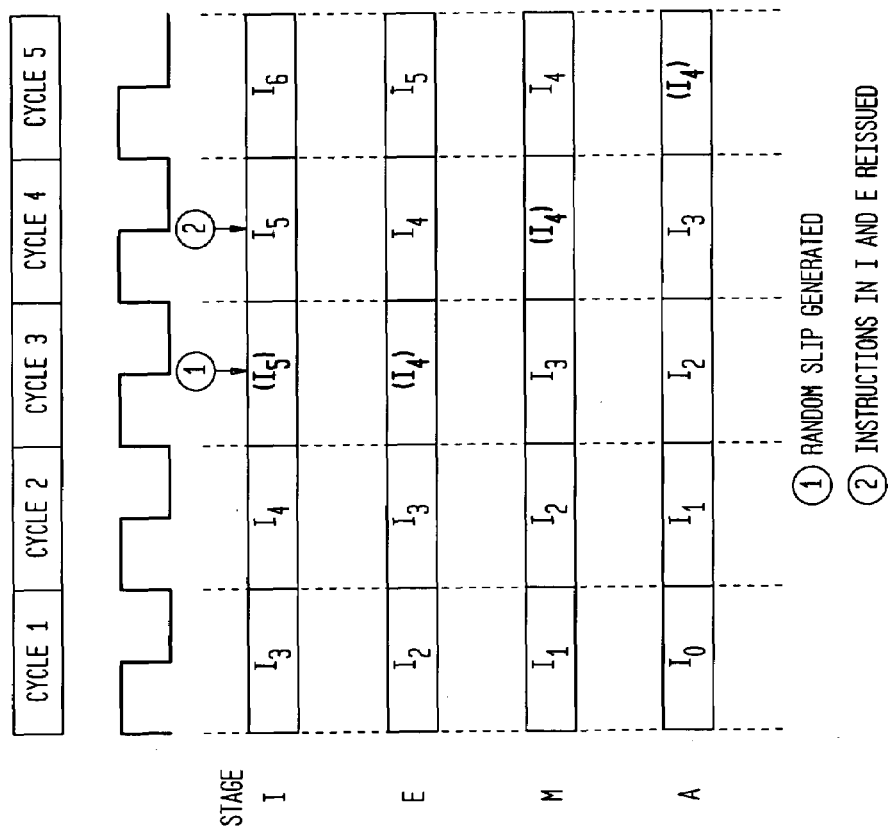
FIG. 4 is a timing diagram describing a randomly-generated pipeline slip propagating a nullified instruction through the pipeline.

Referring to FIG. 4, the random slip generator described above with reference to FIG. 3 may be modified to issue a nullified instruction instead of a NOP. A nullified instruction has a power consumption profile similar to that of other instructions; therefore, the random slip generator may be used to thwart power analysis attacks.

In this implementation, a random slip is similar to a normal IE-slip caused by an instruction interlock. The slip causes the integer pipeline to nullify the instruction in stage E as indicated in FIG. 4 at cycle 3. In cycle 4, the instructions in stages I and E are replayed and the nullified instruction propagates to stage M. In the following cycles, the pipeline functions normally.

A nullified instruction behaves as a NOP instruction in that it does not affect any registers, generate exceptions, or affect memory. However, the data of the nullified instruction pass through the integer pipeline data path, which gives the nullified instruction a power profile similar to an ALU-type instruction. There are a number of techniques addressed below that may be used to make the power profile of the nullified instruction more closely match a real instruction.

In the I stage 1001, an instruction is fetched during the slip cycle as in any other cycle. In the cycle following the slip, the previous fetched instruction is held back and it is therefore not necessary to do an instruction fetch in this cycle. However, the instruction may be refetched to generate a similar power profile.

Figure 5:
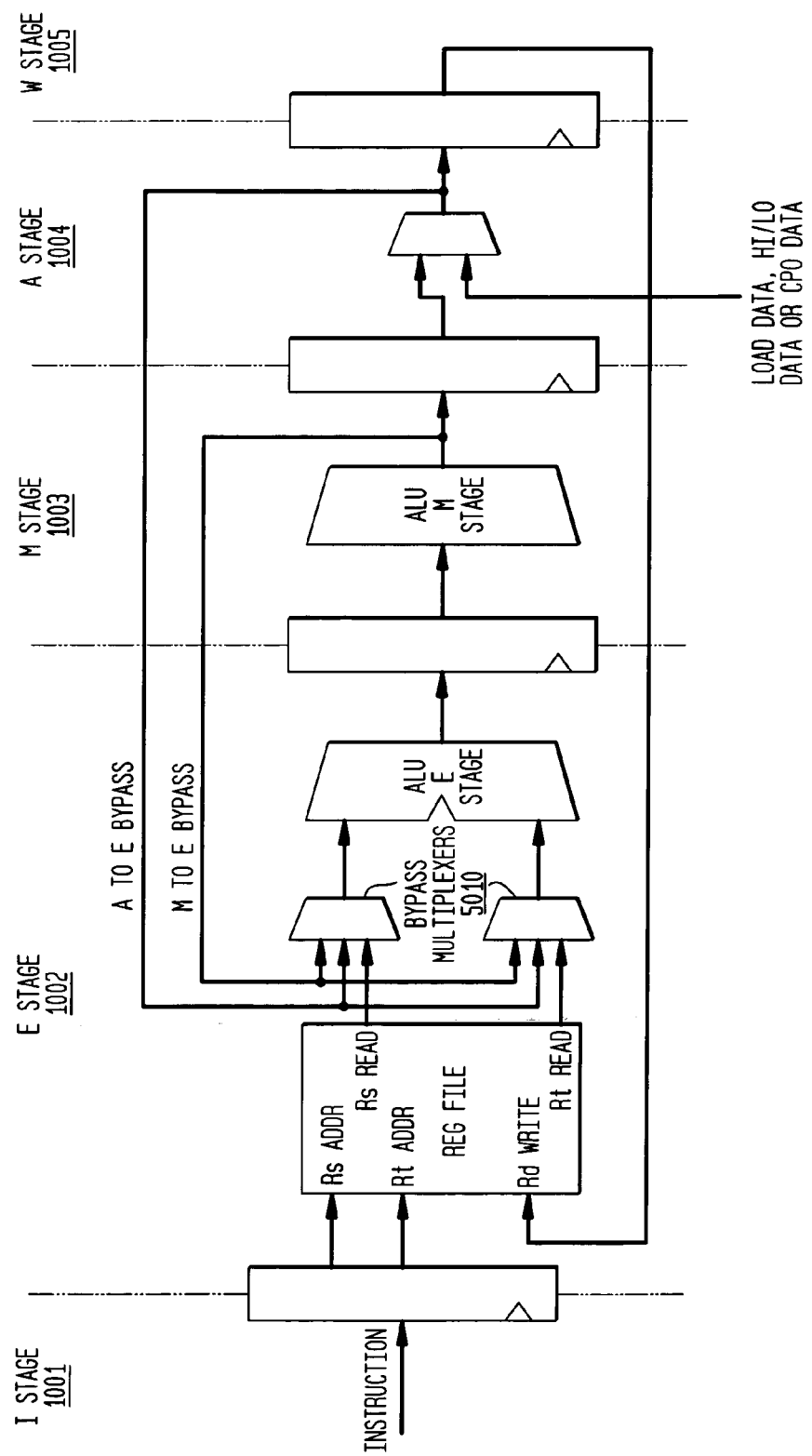
FIG. 5 is a block diagram of a pipeline architecture including various data bypass multiplexers.

Referring to FIG. 5, in the E stage 1002, M stage 1003, and A stage 1004, it is beneficial to perform an operation with a power profile indistinguishable from other operations. If identical data passes through the ALU in the slip cycle and the following cycle, then very little power will be consumed from the ALU in the second cycle. To avoid this, the data to the ALU may be changed in the slip cycle so that the operands are different from those of the nullified instruction (which is replayed in the second cycle). As shown in FIG. 5, the ALU operands may be changed by inverting the control signals to bypass multiplexers 5010.

It may also be desirable to read different locations within the register file when processing the nullified instruction. In some implementations, the register read addresses of the nullified instruction are changed so that the power profile of the nullified instruction is more difficult to distinguish from other instructions.

Additionally, some implementations activate the multiplier logic during the execution of nullified instructions. For example, the multiplier may be activated for each nullified instruction, the multiplier may be periodically activated, or the multiplier may be randomly activated.

In some implementations, the multiplier is activated with a probability that corresponds to the frequency of multiplier instructions in code running on the processor. For example, the system may count the number of multiplier instructions issued in some interval before the nullified instruction, such as, the last five instructions. A random number generator may be used to generate a random number between one and five. The multiplier may be activated if the random number is less than or equal to the number of multiplier instructions counted in the interval.

Some implementations use a simpler method producing approximately the same multiplier activation pattern as the random method above by activating the multiplier during a nullified instruction if the multiplier was activated during a previous instruction. For example, the multiplier may be activated during a nullified instruction if the instruction executed five instructions before the nullified instruction was a multiplier instruction.

In the W stage 1005, a nullified instruction passes without updating any registers. In some embodiments, a nullified instruction may write to a dummy register (i.e., any register that will not ultimately change the outcome of the running process) to generate a power profile indistinguishable from other executing instructions.

Any combinations of the above techniques may be used to generate random slips with power profiles nearly indistinguishable from other instructions; however, each technique adds cost with regard to area and/or speed. In some implementations, a random slip may be implemented identically to other IE-slips except that the inputs to the ALU are changed as mentioned above. This difference comes at a negligible cost with regard to area and speed. In other implementations, the security/cost tradeoff demands that some or all of the remaining techniques be provided.

Figure 6:
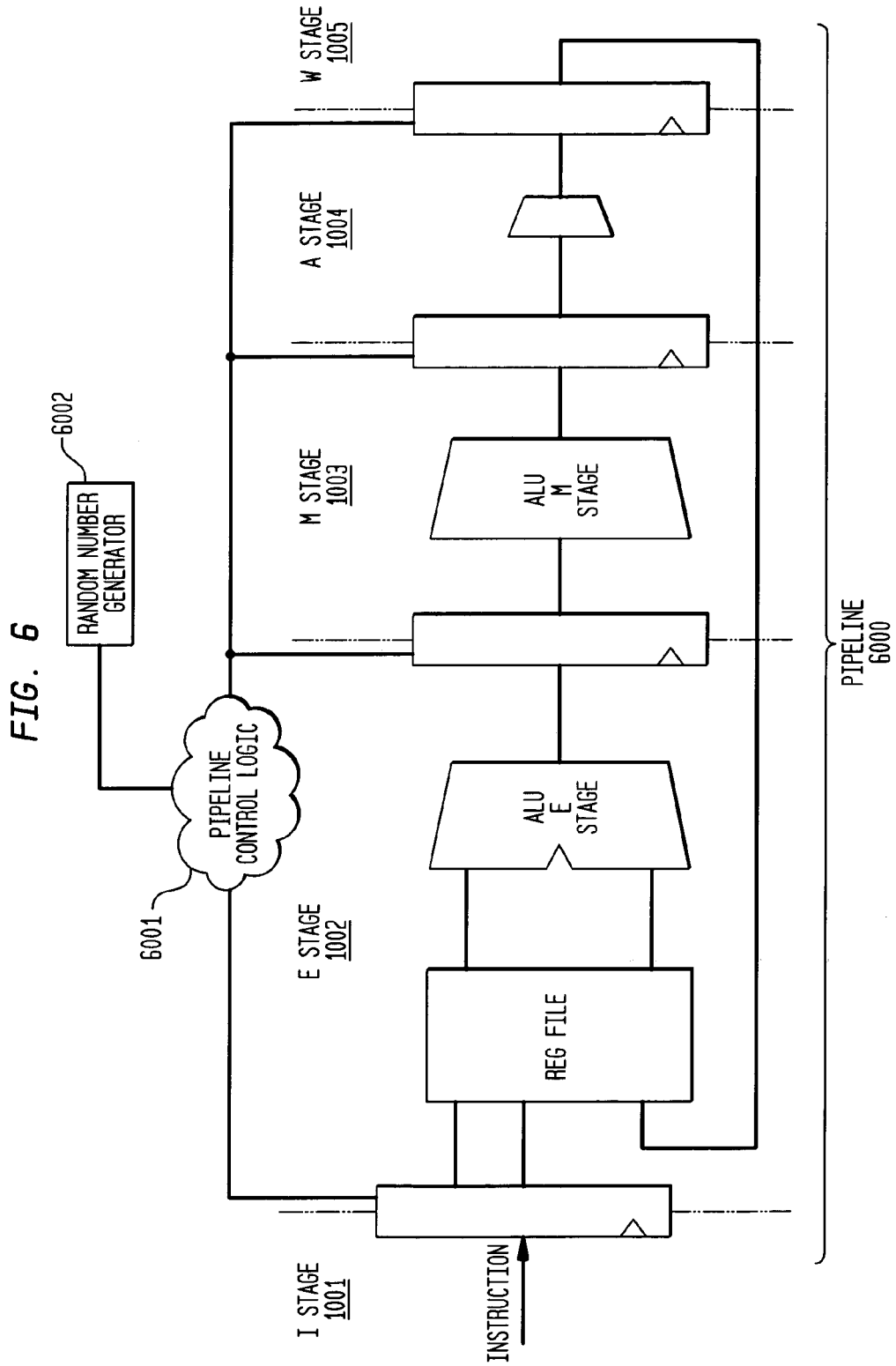
FIG. 6 is a block diagram of a pipeline architecture including control logic for generating slips and/or stalls in the pipeline.

Referring to FIG. 6, a pipeline 6000 may include pipeline control logic 6001 for detecting and implementing slips and stalls in pipeline 6000. Normally, pipeline control logic 6001 stalls and/or slips the pipeline when hazards, such as cache misses, are detected. Using random number generator 6002, the pipeline control logic 6001 also may be caused to randomly initiate a pipeline slip. The block diagram shown in FIG. 5 is a simplified representation of one implementation of a random slip generator. The pipeline control logic 6001 may be designed to control any aspect of the pipeline architecture, including multiplexers and latches.

Random number generator 6002 may be implemented using any method known in the art. The random number generator 6002 may be dedicated for use in random slip generation, or it may provide shared uses. For example, some implementations may modify a conventional processor architecture to support random slip generation by using an existing random number generator so as to avoid the addition of a separate random number generator. It may be desirable to provide a random number generator that generates random or pseudo-random values such that each bit used by the pipeline control logic 6001 is regenerated each clock cycle.

Figure 7:
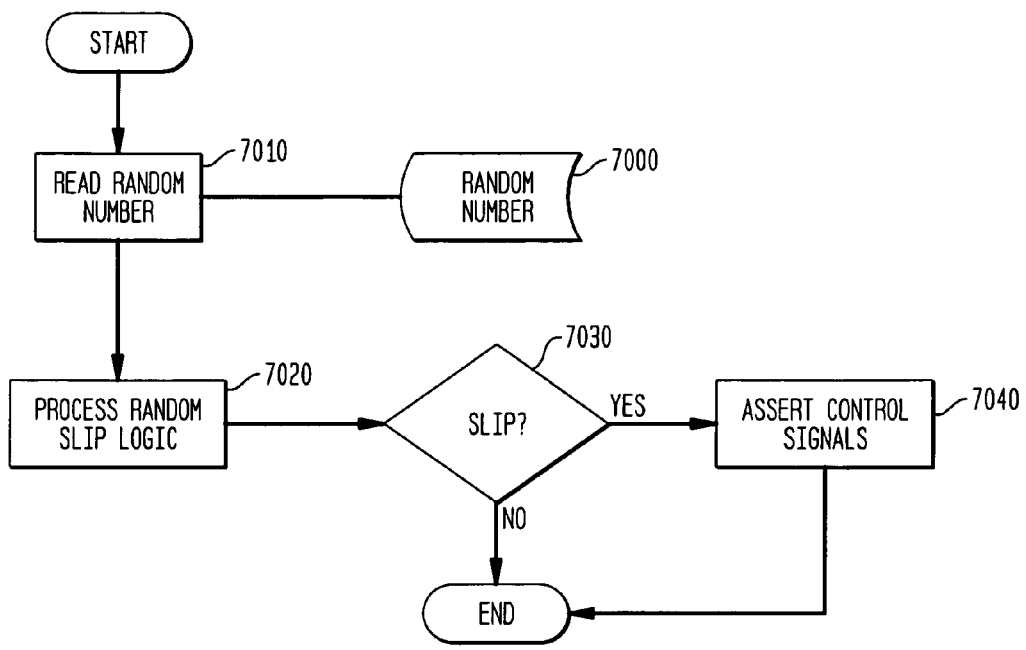
FIG. 7 is a flow chart describing a process for generating random slips in a processor pipeline.

Referring to FIG. 7, random slip generation may be implemented using logic that reads a random number 7000 (step 7010) from the random number generator 6002. Using random number 7000, the system processes random slip logic (step 7020) and determines whether to initiate a slip (step 7030). If the system determines that a slip is to be initiated, the system asserts the appropriate control signals (step 7040) to effectuate the slip. Otherwise, the process ends.

Any condition may be chosen based on random number 7000 to initiate a slip (step 7030). For example, a slip may be initiated if one or more bits of random number 7000 are zero. In one implementation, random number 7000 includes the three low-order bits from random number generator 6002.

Figure 8A:
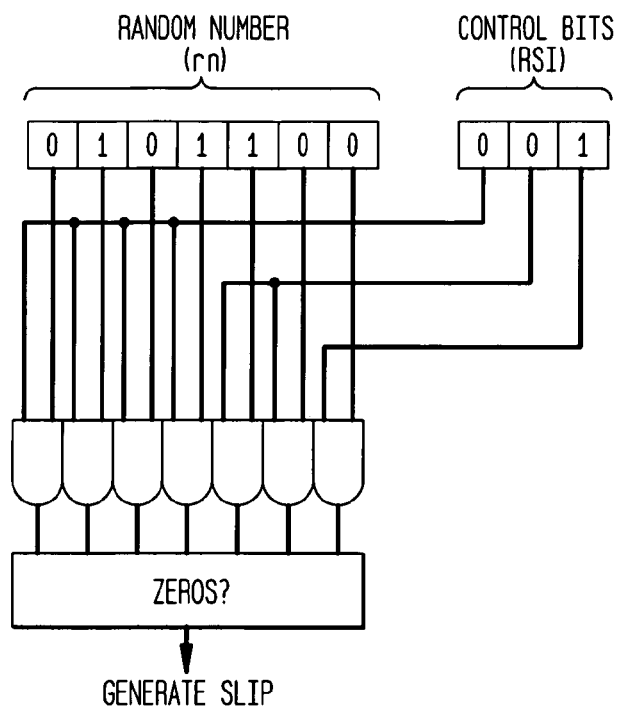
FIGS. 8A and 8B are block diagrams describing logic for determining whether to generate a random slip.
Figure 8B:
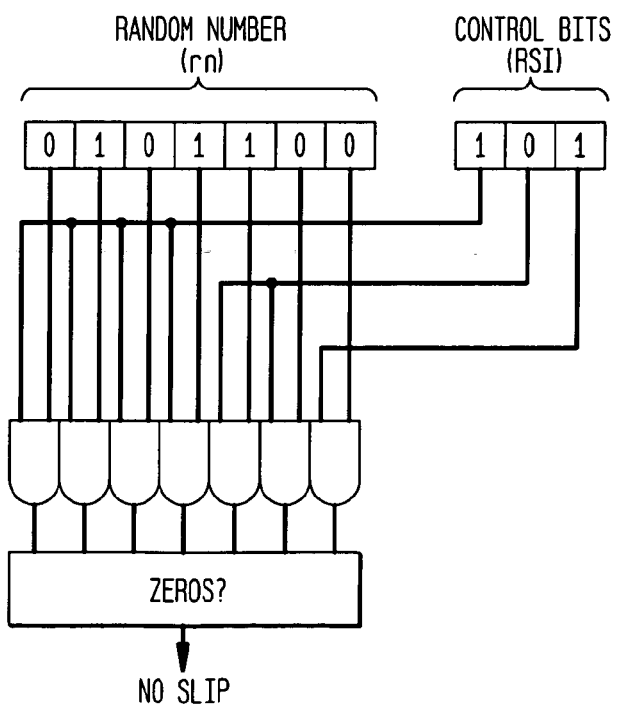

Referring to FIGS. 8A and 8B, additional implementations may provide a configurable random slip generator such that the average frequency of slips per clock cycle may be varied. For example, random slips may be generated whenever n specific bits of the random number 7000 equal zero. The number of bits n can be varied between 1 and 7, by setting a control field, such as a three-bit random slip interval (RSI) field, RSI[2:0], stored in any location accessible by the pipeline control logic 6001. In this way, the average frequency of slips per clock cycle will be between ½ and ¹⁄₁₂₈. Let random number rn[6:0] denote the seven bits which may participate in deciding if a slip should be generated. The seven low-order bits of random number generator 6002 may be used as rn[6:0]. Which of the rn bits that will actually be used is determined using a logic AND between rn[6:0] and a bit pattern created from RSI[2:0] as shown in FIGS. 8A and 8B. Thus, random slips are generated when $rn[6:0]\& \{RSI[2],RSI[2],RSI[2],RSI[2],RSI[1],RSI[1],RSI[0]\}==0.$ To avoid generating slips on every cycle, random slips are disabled if RSI[2:0]=0.

The RSI field may be stored in a coprocessor register SecurityCtrl. A coprocessor provides a mechanism for handling functions outside the responsibility of a standard instruction set architecture (ISA). For example, a coprocessor may provide configuration options, cache control, exception/interrupt control, memory management unit control, and other miscellaneous functions (e.g., timers, event counters, parity error detection). The SecurityCtrl coprocessor register may be stored, for example, in a system coprocessor such as the CP0 register described by Dominic Sweetman in Chapter 3 of "See MIPS Run," Morgan Kaufmann Publishers, Inc. (1999), which is hereby incorporated by reference for its entirety for all purposes. A coprocessor register also may be used to configure the frequency at which a multiplier is activated for nullified instructions as discussed above with reference to FIG. 4.

The implementation FIGS. 8A and 8B uses three control bits that may be used to specify one of seven average frequencies of random slip generation between ½ and 1/128. Each control bit may also be set to "0" to disable random slip generation. In this implementation, the low-order control bit controls a single AND gate, the second control bit controls two AND gates, and the high-order control bit controls four AND gates. Thus, if the control bits read "001" as shown in FIG. 8A, the output of a single AND gate determines whether a random slip is generated. If the random number bit associated with the single AND gate is "1", no slip is generated; however, if the bit is "0", the system generates a slip.

If the control bits are set to "010" then the two AND gates associated with the second control bit determine whether to generate a slip based on the random number. Thus, the average frequency of slip generation is ¼. If the control bits are set to "011", then the average frequency is ⅛. In the example shown in FIG. 8B, no slip is generated because the control bits enable the four high-order bits and the low-order bit of random number 7000. Because two of the five bits are "1" (though only one is required), no slip is generated.

Figure 8C:
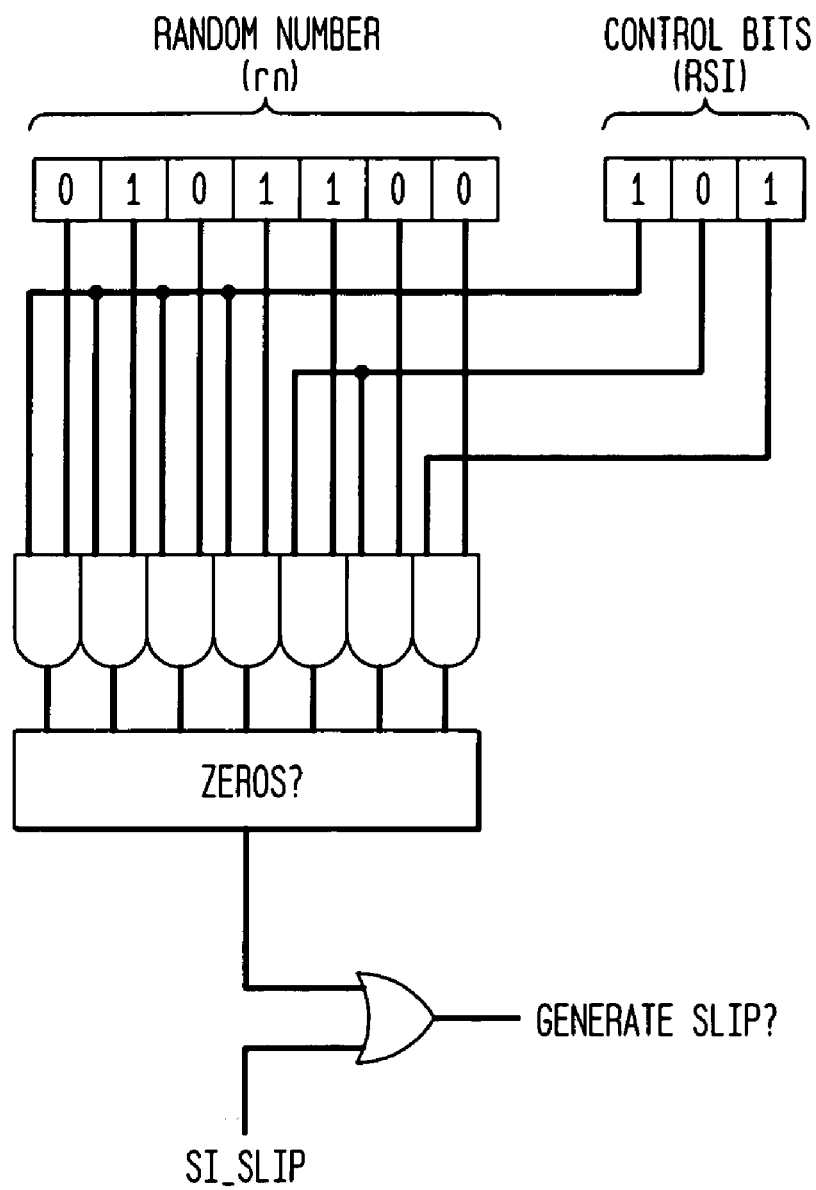
FIG. 8C is a block diagram describing logic for determining whether to generate a processor slip supporting external control.

Referring to FIG. 8C, some implementations of processors supporting random slip generation may include a pin, SI_Slip. When SI_Slip is asserted, the pipeline control logic 6001 generates a slip in the pipeline. This allows processor slips to be controlled outside of the processor, allowing the random slip generation logic to be modified for a particular implementation without redesigning the processor core. If random slips are disabled by setting the control bits to "000", then slips may still be generated by asserting SI_Slip.

As shown in FIG. 8C, SI_Slip may be implemented by taking the logical OR of the output of the logic described with reference to FIGS. 8A and 8B above with the value of SI_Slip. This allows a system to override the random slip generation capabilities of the core by disabling random slip generation (i.e., setting the control register to "000") and by generating slips externally by asserting SI_Slip. Thus, a slip is generated as a result of the random slip logic or as a result of SI_Slip.

Using the techniques described above, a processor core may be created that is able to generate slips at random intervals. This makes the timing and power profiles of algorithms running on the process more indeterministic, thereby garbling information that may be used in side channel attacks. In some implementations, a random slip lasts one clock cycle. However, a new slip may be issued immediately after a preceding slip. Random slips are superimposed on other slips so that if a random slip is issued at the same time as any other slip or stall (e.g., a cache miss or a multi-cycle multiply/divide unit (MDU) operation), then the random slip will not impose any further delay.

In addition to random slip generator implementations using hardware (e.g., within a microprocessor or microcontroller), implementations also may be embodied in software disposed, for example, in a computer usable (e.g., readable) medium configured to store the software (i.e., a computer readable program code). The program code enables the functions or fabrication, or both, of the systems and techniques disclosed herein. For example, this can be accomplished through the use of general programming languages (e.g., C, C++), hardware description languages (HDL) including Verilog HDL, VHDL, AHDL (Altera HDL) and so on, or other available programming and/or circuit (i.e., schematic) capture tools. The program code can be disposed in any known computer usable medium including semiconductor, magnetic disk, optical disk (e.g., CD-ROM, DVD-ROM) and as a computer data signal embodied in a computer usable (e.g., readable) transmission medium (e.g., carrier wave or any other medium including digital, optical, or analog-based medium). As such, the code can be transmitted over communication networks including the Internet and intranets.

It is understood that the functions accomplished and/or structure provided by the systems and techniques described above can be represented in a core (e.g., a microprocessor core) that is embodied in program code and may be transformed to hardware as part of the production of integrated circuits. Also, the systems and techniques may be embodied as a combination of hardware and software. Accordingly, other implementations are within the scope of the following claims.

What is claimed is:

1. A microprocessor with random slip generation comprising:
   an instruction execution pipeline;
   pipeline control logic coupled to the pipeline;
   a random number generator that generates a random value used by the pipeline control logic to selectively initiate a pipeline slip; and
   a random slip generation control register,
   wherein bits stored in the random slip generation control register control a number of bits of the random value used to selectively initiate the pipeline slip.

2. The microprocessor of claim 1 wherein selectively initiating a pipeline slip includes:
   inserting a no-operation (NOP) instruction into the pipeline in place of an instruction; and
   reissuing the instruction in a following clock cycle.

3. The microprocessor of claim 1 wherein selectively initiating a pipeline slip includes:
   nullifying an instruction executing within the pipeline; and
   reissuing the instruction in a following clock cycle,
   wherein the nullified instruction and the reissued instruction each pass through the pipeline.

4. The microprocessor of claim 3 wherein reissuing the instruction in a following clock cycle includes refetching the instruction.

5. The microprocessor of claim 3 wherein the instruction execution pipeline includes an arithmetic logic unit (ALU) and wherein operands of the nullified instruction are changed so that data passed through the ALU by the nullified instruction differs from data passed through the ALU by the reissued instruction.

6. The microprocessor of claim 3 wherein the nullified instruction is changed so that registers to which the nullified instruction refers differ from registers to which the reissued instruction refers.

7. The microprocessor of claim 3 further comprising a multiplication unit, wherein the multiplication unit is selectively active when the nullified instruction is passing through the pipeline.

8. The microprocessor of claim 7 wherein the multiplication unit is selectively active based on the random value.

9. The microprocessor of claim 1 wherein the random slip generation control register may be used to specify an average frequency of slips per clock cycle.

10. The microprocessor of claim 1 wherein the random slip generation control register includes n bits and wherein the n bits may be used to specify an average frequency of slips per clock cycle from a group consisting of up to $2^n$ values.

11. The microprocessor of claim 1 wherein the random slip generation control register includes three bits and wherein the three bits may be used to specify an average frequency of slips per clock cycle from the group consisting of: 0½, ¼, ⅛, 1/16, 1/32, 1/64, and 1/128.

12. The microprocessor of claim 1 wherein the pipeline control logic selectively initiates a pipeline slip if each of the random value bits specified by bits stored in the random slip generation control register has the same value.

13. The microprocessor of claim 1 further comprising a random slip generation pin, wherein the pipeline control logic selectively initiates a pipeline slip if the random slip generation pin is asserted.

14. In a microprocessor including a pipeline, a random slip generator comprising:
a control register that stores one or more control bits;
a random number generator that generates a random value; and
random slip generation logic that selectively generates a signal requesting a pipeline slip based on a number of bits of the random value specified by the one or more control bits.

15. The random slip generator of claim 14 wherein the one or more control bits specify an average frequency of slips per clock cycle.

16. The random slip generator of claim 15 wherein the control register stores n bits and wherein the n bits may be used to specify an average frequency of slips per clock cycle from a group consisting of up to $2^n$ values.

17. The random slip generator of claim 15 wherein the control register stores three bits and wherein the three bits may be used to specify an average frequency of slips per clock cycle from the group consisting of: 0, /1;2, /1;4, /1;8, /1;16, /1;32, /1;64, and /1;128.

18. The random slip generator of claim 14 wherein the random slip generator selectively generates a signal requesting a pipeline slip if each of the random value bits specified by the one or more control bits is zero.

19. In a microprocessor, a method for generating random pipeline slips comprising:
generating a random value;
determining whether to generate a pipeline slip based on a number of bits of the random value specified by bits stored in a random slip generation control register; and
if the determination is to generate a pipeline slip, asserting one or more control signals to effectuate the pipeline slip.

20. The method claim 19 wherein bits stored in the random slip generation control register specify an average frequency of slips per clock cycle.

21. The method of claim 20 wherein the random slip generation control register stores n bits and wherein the n bits may be used to specify an average frequency of slips per clock cycle from a group consisting of up to $2^n$ values.

22. The method of claim 20 wherein the random slip generation control register stores three bits and wherein the three bits may be used to specify an average frequency of slips per clock cycle from the group consisting of: 0, ½, ¼, ⅛, 1/16, 1/32, 1/64, and 1/128.

23. The method of claim 19 wherein pipeline control logic selectively initiates a pipeline slip if all of the random value bits specified by bits stored in the random slip generation control register have the same value.

24. The method of claim 19, wherein performing a pipeline slip includes:
inserting a no-operation (NOP) instruction into the pipeline in place of an instruction; and
reissuing the instruction in a following clock cycle.

25. The method of claim 19, wherein performing a pipeline slip includes:
nullifying an instruction executing within the pipeline; and
reissuing the instruction in a following clock cycle,
wherein the nullified instruction and the reissued instruction each pass through the pipeline.

26. The method of claim 25 wherein reissuing the instruction in a following clock cycle includes refetching the instruction.

27. The method of claim 25 wherein the microprocessor includes an arithmetic logic unit (ALU) and wherein operands of the nullified instruction are changed so that data passed through the ALU by the nullified instruction differ from data passed through the ALU by the reissued instruction.

28. The method of claim 25 wherein the nullified instruction is changed so that registers to which the nullified instruction refers differ from registers to which the reissued instruction refers.

29. The method of claim 25 wherein the microprocessor includes a multiplication unit that is selectively active when the nullified instruction is passing through the pipeline.

30. The method of claim 29 wherein the multiplication unit is selectively active based on the random value.

31. A tangible computer-readable storage medium comprising a microprocessor core embodied in software, the microprocessor core including a random slip generator comprising:
a control register that stores one or more control bits;
a random number generator that generates a random value; and
random slip generation logic that selectively generates a signal requesting a pipeline slip based on a number of bits of the random value specified by the one or more control bits.

32. The tangible computer-readable storage medium of claim 31 wherein the one or more control bits specify an average frequency of slips per clock cycle.

33. The tangible computer-readable storage medium of claim 32 wherein the control register stores n bits and wherein the n bits may be used to specify an average frequency of slips per clock cycle from a group consisting of up to 2" values.

34. The tangible computer-readable storage medium of claim 32 wherein the control register includes three bits and wherein the three bits may be used to specify an average frequency of slips per clock cycle from the group consisting of: 0, 1/2, 1/4, 1/8, 1/16, 1/32, 1/64, and 1/128.

35. The tangible computer-readable storage medium of claim 31 wherein the random slip generator selectively generates a signal requesting a pipeline slip if all of the random value bits specified by the one or more control bits have the same value.

* * * * *

UNITED STATES PATENT AND TRADEMARK OFFICE
CERTIFICATE OF CORRECTION

PATENT NO. : 7,318,145 B1  Page 1 of 1
APPLICATION NO. : 10/141579
DATED : January 8, 2008
INVENTOR(S) : Stribaek et al.

It is certified that error appears in the above-identified patent and that said Letters Patent is hereby corrected as shown below:

Column 9

In line 8, "0 ½, ¼" is replaced with --0, ½, ¼--.

In lines 36-37, "0, /1;2, /1;4, /1;8, /1;16, /1;32, /1;64, and /1;128." is replaced with -- 0, ½, ¼, ⅛, 1/16, 1/32, 1/64, and 1/128 .--

Column 10

In line 57, "0, 1/2, 1/4, 1/8, 1/16, 1/32, 1/64, and 1/128." is replace with

-- 0, ½, ¼, ⅛, 1/16, 1/32, 1/64, and 1/128 .--

Signed and Sealed this

Sixth Day of May, 2008

JON W. DUDAS
*Director of the United States Patent and Trademark Office*